United States Patent
Marshall

(10) Patent No.: US 6,930,971 B2
(45) Date of Patent: Aug. 16, 2005

(54) ULTRA-HIGH DENSITY STORAGE DEVICE WITH ELECTRON BEAM STEERING

(75) Inventor: Daniel R. Marshall, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 655 days.

(21) Appl. No.: 09/893,246

(22) Filed: Jun. 26, 2001

(65) Prior Publication Data

US 2002/0196725 A1 Dec. 26, 2002

(51) Int. Cl.[7] ................................................. G11B 7/00
(52) U.S. Cl. ...................................... 369/101; 369/126
(58) Field of Search ................................ 369/101, 126, 369/44.23, 44.24

(56) References Cited

U.S. PATENT DOCUMENTS

| | | |
|---|---|---|
| 5,557,596 A | 9/1996 | Gibson et al. |
| 5,920,336 A | 7/1999 | Lawton et al. |
| 6,307,826 B1 * | 10/2001 | Katsumura et al. ......... 369/101 |

* cited by examiner

Primary Examiner—Nabil Hindi

(57) ABSTRACT

A storage device including many field emitters in close proximity to a storage medium, and a micromover, all in a partial vacuum. Each field emitter can generate an electron beam current. The storage medium has many storage areas on it, with each field emitter responsible for a number of storage areas. Also, each storage area can be in a number of different states to represent the information stored in that area. In storing information to the storage device, the power density of an electron beam current is increased to change the state of the storage area bombarded by the electron beam current. In reading information from the device, the power density of the electron beam current is reduced to generate a signal current from the storage area bombarded by the electron beam current. During reading, the power density is selected to be low enough so that no writing occurs. The magnitude of the signal current depends on the state of the storage area. The information stored in the storage area is read by measuring the magnitudes of the signal current. An electron beam steering mechanism deflects the electron beam current to different ones of the storage areas.

20 Claims, 6 Drawing Sheets

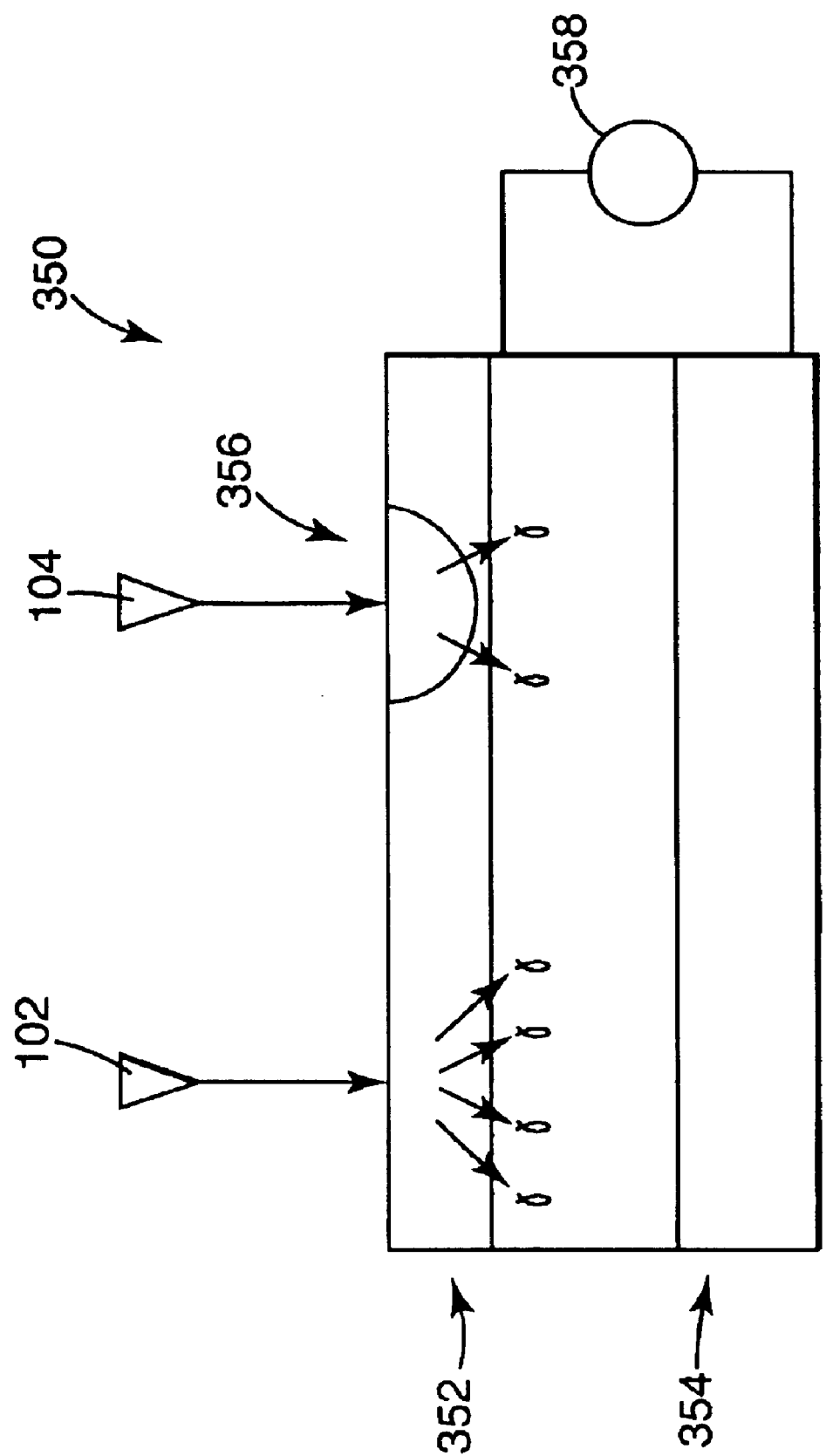

ULTRA-HIGH DENSITY STORAGE DEVICE WITH ELECTRON BEAM STEERING

FIELD OF THE INVENTION

The present invention relates generally to storage devices, and more particularly to storage devices based on field emitters.

BACKGROUND OF THE INVENTION

For decades, researchers have been trying to increase the storage density and reduce the cost/storage in information storage devices, such as magnetic hard-drives, optical drives, and DRAM. However, it has become increasingly difficult to squeeze more information into the storage devices. Moreover, conventional technologies to make those devices may be approaching fundamental limits on storage density.

Many scientists have proposed alternative approaches to increase the storage density. One approach is based on Scanned Probe Microscopy (SPM) technologies. Typically, in such an approach, a probe is positioned extremely close to a storage medium. For example, in one implementation of Atomic Force Microscopy, the probe physically touches the medium; in Scanning Tunneling Microscopy (STM), the probe is within a few nanometers of the medium to ensure that the probe is within tunneling range of the medium. It is difficult to inexpensively build a storage system with a probe in contact with or in such extremely close proximity to the medium without, eventually, damaging or effacing the surface of the medium or the probe. Moreover, in STM, the nanometer spacing must be precisely controlled. This is a difficult task. Some researchers have found methods to eliminate the need for such extremely close proximity. One technique is based on Near-Field Scanning Optical Microscopy. However, this technique has limited lateral resolution and bandwidth. Other techniques are based on non-contact Scanning Force Microscopy, which typically suffers from poor resolution and poor signal to noise ratio.

Even if one has increased the storage density, one still has to overcome another major hurdle, which is the time required to access the information. The storage device's utility is limited if it takes a long time to retrieve the stored information. In other words, in addition to high storage density, one must find a way to quickly access the information.

It should be apparent from the foregoing that there is still a need for a storage device that is based on a non-conventional approach, with significantly increased storage density, and low cost/storage. Additionally, the storage device preferably should have fast access times and high data rates. Furthermore, the storage device should preferably eliminate the requirement for extremely close proximity between the probe and storage medium.

SUMMARY OF THE INVENTION

One embodiment of the present invention provides a storage device that includes a field emitter for generating an electron beam current. A storage medium is located in close proximity to the field emitter with the storage medium having a plurality of storage areas for storage. The storage areas can be in one of a plurality of states that represent the information stored in those storage areas. An effect is generated when the electron beam current bombards a storage area. The magnitude of the effect depends on the state of the bombarded storage area, with the information stored in the bombarded storage area being determined by measuring the magnitude of the effect. An electron beam steering mechanism deflects the electron beam current in two substantially perpendicular directions to different ones of the storage areas.

BRIEF DESCRIPTION OF THE DRAWINGS

FIG. 7 is a diagram illustrating one embodiment of a storage device with a storage medium based on a fluorescent medium.

DESCRIPTION OF THE PREFERRED EMBODIMENTS

Figure 1A:
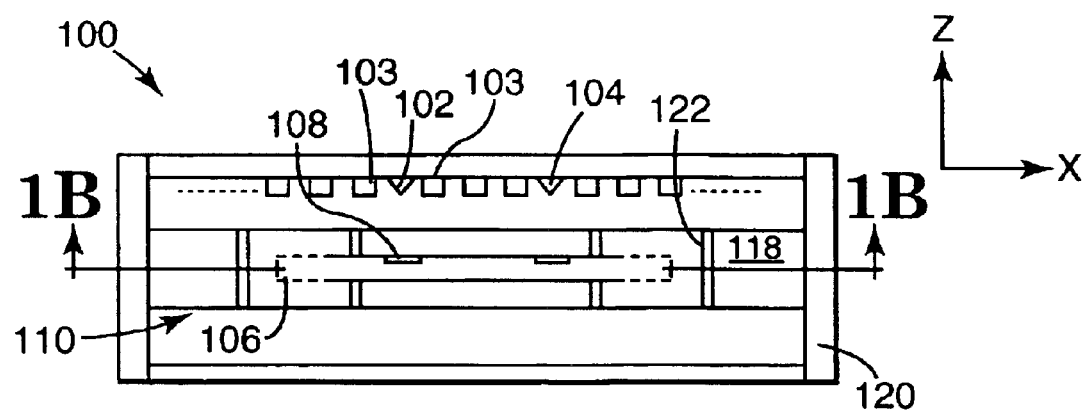
FIG. 1A is cross-sectional view of one embodiment of a storage device according to the present invention.

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Gibson et al., U.S. Pat. No. 5,557,596, herein incorporated by reference, describes an ultra-high density storage device. In one embodiment, the storage medium described in Gibson et al. is divided into a two-dimensional X-Y grid of storage areas. For a storage device that uses a two-dimensional X-Y grid of storage areas, a micromover can be used to move the storage medium and a read/write element relative to each other in discrete steps in X and Y directions, to access the various storage areas. Such discrete movements may be accomplished with electro-static stepper motors. For each move of the read/write element to a new position, the stepper motor must accelerate the element, reach a particular velocity, decelerate, and then stop, typically in two degrees of freedom.

In addition, for a storage device that uses a two-dimensional X-Y grid of storage areas, each storage area typically stores one bit of data. However, most real data is seldom just a single bit. Rather, it is usually made up of many bits in a standard sequence. The actions of starting, accelerating, decelerating and stopping for each bit of data in a sequence of data results in slow movement and long access times. Further, by limiting movement of the read/write element to discrete positions, pulse width modulation (PWM) techniques cannot be used.

The sequential nature of data tends to constrain the kind of motion algorithms used for a particular application. In a hard disk drive, for example, data is usually located in concentric tracks, laid down around a disk that spins. Locating a particular sequence of bits requires that a motion controller move the heads for reading and writing to a particular radial location, then wait for a selected sequence to appear as the disk spins—usually at a constant angular velocity. In contrast, in compact disk recording, a spiral path is traced outward from an inner radius of the disk, at a constant linear velocity (the angular velocity decreases with increasing radius). The difference between these two motion algorithms results mainly from the fact that compact disk players are optimized for very long sequences of bits, whereas disk drives usually respond to requests for data patterns of widely varying length. It is evident that optimizing movement patterns to store sequences of bits in an X-Y array of storage areas is very important in optimizing the performance of a storage device.

One potential technique for controlling read/write positioning in an ultra-high density storage device is to use an electron beam steering or deflecting mechanism to control the position of an electron beam used for reading and writing. Beam steering mechanisms have been used before in other applications. For example, cathode ray tubes (CRTs) use a steering mechanism to scan an electron beam across a display surface. Also, Lawton et al, U.S. Pat. No. 5,920,336, herein incorporated by reference, discloses a beam deflecting method for resolution enhancement and banding reduction in a laser printer. In one embodiment, beam deflectors are used to produce a periodic trajectory of a laser beam in a laser printer.

It would be desirable for an ultra-high density storage device to make use of an electron beam steering mechanism to deflect an electron beam, and thereby provide fast and efficient positioning for reading data from and writing data to a storage medium, make use of more memory sites or storage areas, and provide continuous positioning so that techniques such as PWM may be used.

FIG. 1A illustrates a side cross-sectional view of one embodiment of a storage device 100. Storage device 100 includes a number of field emitters, such as field emitters 102 and 104, a storage medium 106 including a number of storage areas, such as storage area 108, and micromover 110. Micromover 110 scans storage medium 106 with respect to the field emitters 102 and 104 or vice versa. In one preferred embodiment, each storage area 108 is responsible for storing one bit of information. In one form of the invention, electron beam steering (described below) is used in conjunction with movement generated by micromover 110 to provide more efficient and flexible positioning for read/write operations. In an alternative embodiment, electron beam steering is used without micromover 110.

In one embodiment, field emitters 102 and 104, are point emitters having relatively sharp points. Each point emitter may have a radius of curvature in the range of approximately 1 nanometer to hundreds of nanometers. During operation, a pre-selected potential difference is applied between a field emitter and its corresponding gate, such as between field emitter 102 and circular gate 103 surrounding it. Due to the sharp point of the emitter, an electron beam current is extracted from the emitter towards storage medium 106. Depending on the distance between the emitters and the storage medium 106, the type of emitters, and the spot size (bit size) required, electron optics may be utilized to focus the electron beams. A voltage may also be applied to the storage medium 106 to either accelerate or decelerate the field-emitted electrons or to aid in focusing the field-emitted electrons.

In other embodiments, field emitter 102 is not a point emitter, but is another type of suitable electron emitter. For example, in one embodiment, field emitter 102 is a flat emitter, such as described in detail in the commonly assigned U.S. patent application Ser. No. 09/617,876 entitled "SELF-ALIGNED ELECTRON SOURCE DEVICE" filed Jul. 17, 2000, and which is herein incorporated by reference.

In one embodiment, casing 120 maintains storage medium 106 in a partial vacuum, such as at least 10–5 torr. It is known in the art to fabricate such types of microfabricated field emitters in vacuum cavities using semiconductor processing techniques. See, for example, "Silicon Field Emission Transistors and Diodes," by Jones, published in IEEE Transactions on Components, Hybrids and Manufacturing Technology, 15, page 1051, 1992.

In one embodiment, each field emitter 102 and 104 is responsible for a number of storage areas 108. As micromover 110 moves storage medium 106 to different locations, each emitter 102 and 104 is positioned above or near different storage areas 108. With micromover 110, an array of field emitters can scan over storage medium 106.

In one embodiment, micromover 110 is fabricated by a standard semiconductor microfabrication process to scan storage medium 106 in the X and Y directions with respect to casing 120. In one form of the invention, in addition to using micromover 110 for read/write positioning, electron beam steering is used to deflect the electron beams generated by field emitters 102 and 104 in X and Y directions as described in further detail below. As mentioned above, in an alternative embodiment, micromover 110 is not used, and read/write positioning is provided only by electron beam steering.

As will be described, field emitters 102 and 104 are responsible to read and write information on storage areas 108 by means of the electron beams they produce. Thus, field emitters suitable for use in storage device 100 are of the type that can produce electron beams that are narrow enough to achieve the desired bit density on the storage medium, and can provide the power density of the beam current needed for reading from and writing to the medium. A variety of ways are known in the art that are suitable to make such field emitters. For example, one method is disclosed in "Physical Properties of Thin-Film Field Emission Cathodes With Molybdenum Cones," by Spindt et al, published in the Journal of Applied Physics, Vol. 47, No. 12, December 1976. Another method is disclosed in "Fabrication and Characteristics of Si Field Emitter Arrays," by Betsui, published in Tech. Digest $4^{th}$ Int. Vacuum Microelectronics Conf., Nagahama, Japan, page 26, 1991.

In one embodiment, there is a two-dimensional array of emitters, such as 100 by 100 emitters, with an emitter pitch of 50 micrometers in both the X and the Y directions. Each emitter may access bits in tens of thousands to hundreds of millions of storage areas. Also, all of the emitters may be addressed simultaneously or in a multiplexed manner. Such a parallel accessing scheme significantly reduces access time, and increases the data rate of the storage device.

Figure 1B:
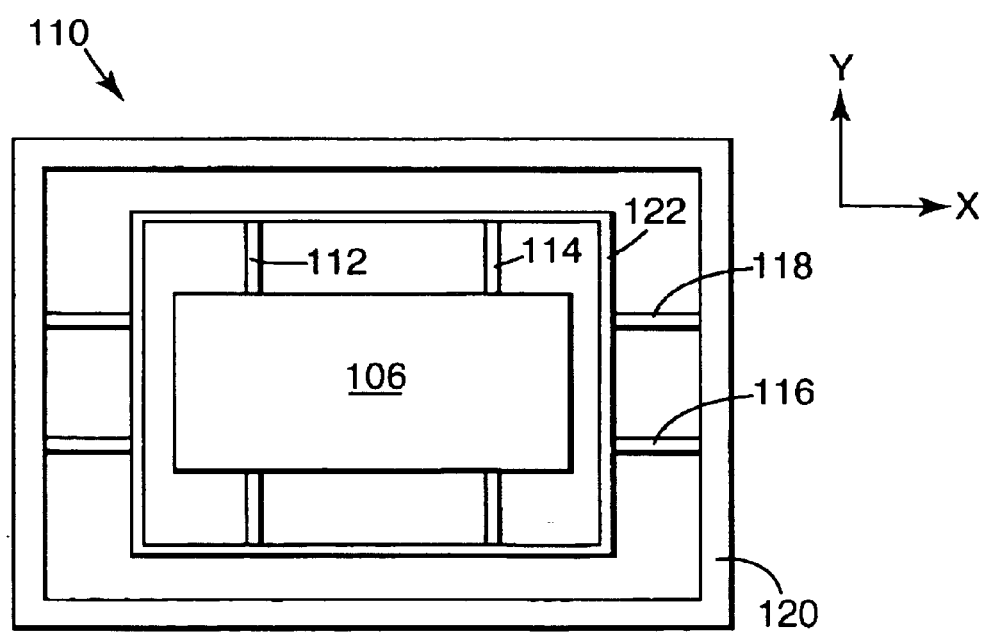
FIG. 1B is a top cross-sectional view of the storage device of FIG. 1A taken along lines 1B—1B from FIG. 1A.

FIG. 1B shows a top view of the cross section 1B—1B in FIG. 1A, illustrating micromover 110. Micromover 110 includes beams 112, 114, 116 and 118, casing 120 and frame 122. Storage medium 106 is held by two sets of thin-walled microfabricated beams or flexures. The faces of the first set of thin-walled beams are in the Y-Z plane, such as beams 112 and 114. Thin-walled beams 112 and 114 may be flexed in the X direction allowing storage medium 106 to move in the X direction with respect to casing 120. The faces of the second set of thin-walled beams are in the X-Z plane, such as beams 116 and 118. Thin-walled beams 116 and 118 allow storage medium 106 to move in the Y direction with respect to casing 120. Storage medium 106 is held by the first set of beams 112 and 114, which are connected to frame 122. Frame 122 is held by the second set of beams 116 and 118, which are connected to casing 120. The field emitters 102 and 104 scan over storage medium 106, or storage medium 106 scans over field emitters 102 and 104, in the X-Y directions by electrostatic, electromagnetic, piezoelectric, or other means known in the art. In this example, micromover 110 moves storage medium 106 relative to the field emitters 102 and 104. A general discussion of such a microfabricated micromover can be found, for example, in "Novel Polysilicon Comb Actuators for XY-Stages," published in the Proceeding of MicroElectro Mechanical Systems 1992, written by Jaecklin et al.; and in "Silicon Micromechanics: Sensors and Actuators on a Chip", by Howe et al., published in IEEE Spectrum, page 29, in July 1990.

Figure 2:
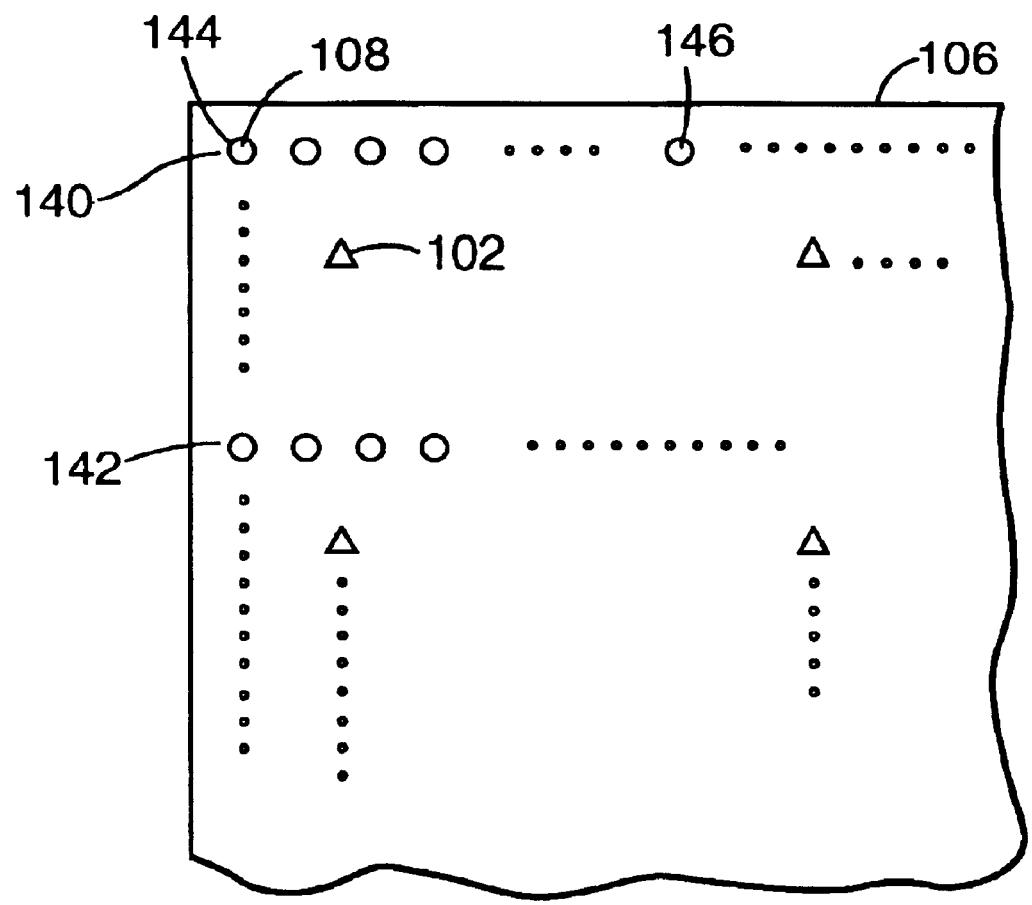
FIG. 2 is a top view of a portion of a storage medium of the storage device of FIG. 1A.

FIG. 2 shows a top view of one embodiment of storage medium 106 having a two-dimensional array of storage areas 108 and a two-dimensional array of emitters 102. Addressing the storage areas 108 requires external circuits. In one embodiment, to reduce the number of external circuits, storage medium 106 is separated into rows, such as rows 140 and 142, where each row contains a number of storage areas 108. Each emitter 102 is responsible for a number of rows. However, in this embodiment, each emitter 102 is not responsible for the entire length of the rows. For example, a first emitter 102 is responsible for the storage areas within rows 140 through 142, and within columns 144 through 146. In one embodiment, all rows of storage areas 108 accessed by one emitter 102 are connected to one external circuit. In one embodiment, to address a storage area 108, the emitter 102 responsible for that storage area 108 is activated, and the electron beam from the emitter 102 is steered to that storage area 108. In an alternative embodiment, electron beam steering is used in conjunction with relative movement between storage medium 106 and the emitter 102 to appropriately position the electron beam over or near the storage area. The external circuit connected to the rows of storage areas within which that storage area lies is also activated.

Figure 3:
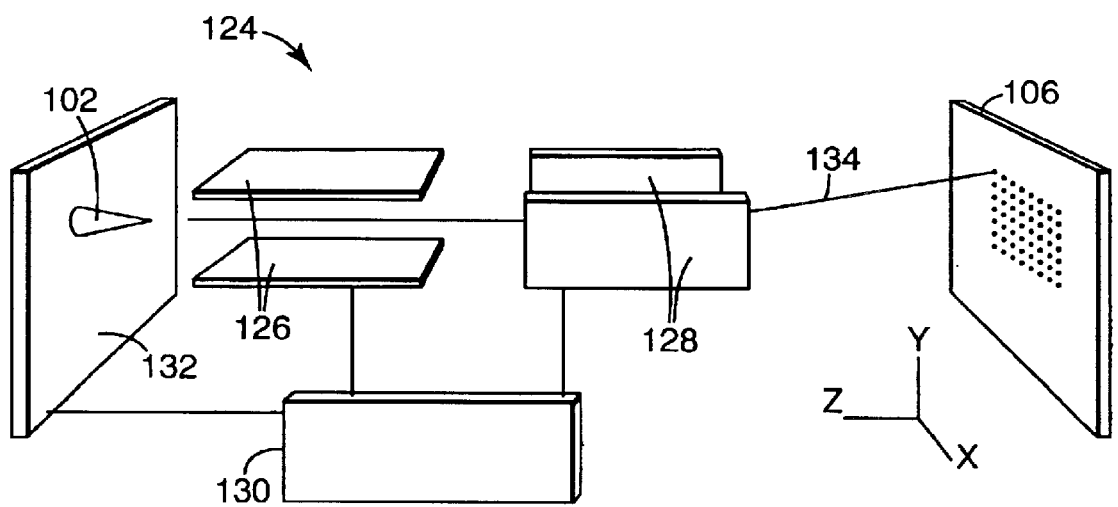
FIG. 3 is a diagram illustrating an electron beam steering system according to one embodiment of the present invention.

FIG. 3 is a diagram illustrating an electron beam steering system 124 according to one embodiment of the present invention. Electron beam steering system 124 steers electron beam 134 in X and Y directions to appropriately position the beam 134 over a desired storage area 108 on storage medium 106, or to produce any desired trajectory of the beam 134 over any desired number of storage areas 108. Electron beam steering system 124 includes Y deflection electrodes 126, X deflection electrodes 128, and controller 130. Also shown in FIG. 3 are field emitter 102 mounted on substrate 132, storage medium 106, and electron beam 134.

Controller 130 is coupled to field emitter 102, Y deflection electrodes 126, and X deflection electrodes 128. Controller 130 controls the power density and timing of the electron beam 134 generated by field emitter 102 for read/write operations. Y deflection electrodes 126 deflect electron beam 134 in the Y direction in an amount based upon control signals provided by controller 130. X deflection electrodes 128 deflect electron beam 134 in the X direction in an amount based upon control signals provided by controller 130. Those of ordinary skill in the art are aware of techniques for deflecting electron beams. For example, in one embodiment, deflection electrodes 126 could be implemented with two parallel conductors, and deflection electrodes 128 could be implemented with two parallel conductors that are each perpendicular to the conductors of deflection electrodes 126.

In one embodiment, each field emitter 102 and 104 in storage device 100 includes a set of electrodes 126 and 128 for steering the electron beam generated by the field emitter. In one form of the invention, electrodes 126 and 128 are formed on substrate 132. In another form of the invention, electrodes 126 and 128 are formed on storage medium 106. In another embodiment, electrodes 126 are held in place between substrate 132 and storage medium 106 by a separate mechanical assembly.

In one embodiment, in addition to using electron beam steering, emitters 102 and 104 are caused to move with respect to storage medium 106, rather than storage medium 106 being moved with respect to emitters 102 and 104. In another embodiment, in addition to using electron beam steering, both the emitters 102 and 104, and the storage medium 106 are moved. It will be understood that whether the emitters are moved with respect to the storage medium, whether the storage medium is moved with respect to the emitters, or whether both the emitters and the storage medium are moved, it is the relative movement between the two that is important. The trajectory that is traced out by electron beam 134 on storage medium 106 is referred to as the electron beam trajectory, regardless of what combination of movement and beam steering techniques are used.

In one embodiment, the beam trajectory is periodic in both the X and the Y direction. In alternative embodiments, the beam trajectory is periodic in one dimension and static in a second dimension, or periodic in one dimension with linear movements in a second dimension. The periodic movements can be used in combination with linear movements to produce virtually any type of beam trajectories, including circles, ellipses, spirals, squares, rectangles, figure 8's, triangular wave shapes, sawtooth wave shapes, Lissajous wave shapes, rectangular wave shapes, sinusoidal wave shapes, or any other desired trajectory.

Controller 130, which is responsible for read/write timing, samples or writes to storage medium 106 at appropriate times to access a regular grid of storage areas 108 on storage medium 106. Using periodic beam trajectories and appropriate read/write timing, rectilinear grids of storage areas, including rectangular grids with uniform spacing of the storage areas 108 in the X and Y directions, can be accessed. Since a read or write operation may or may not occur at a given storage area location, grid locations are referred to as "available storage area locations".

A benefit provided by continuous trajectories is that so-called pulse-width modulation (PWM) techniques can be used, rather than, or in addition to, pulse-position techniques. Hard disk drives typically use pulse-width modulation techniques. An advantage of PWM techniques is the ability to obtain a higher density of recorded information.

In one embodiment, writing is accomplished in storage device 100 by temporarily increasing the power density of the electron beam current to modify the surface state of the storage area 108. Reading is accomplished by measuring the effect of storage area 108 on the electron beams, or the effect of the electron beams on the storage area 108. For example, a storage area 108 that has been modified can represent a bit 1, and a storage area 108 that has not been modified can represent a bit 0, and vice versa. In fact, storage area 108 can be modified to different degrees to represent more than two bits. Some modifications may be permanent, and some modifications may be reversible. The permanently modified storage medium is suitable for write-once-read-many memory (WORM).

In one embodiment, the structure of the storage area 108 is altered in such a way as to vary its secondary electron emission coefficient (SEEC), its back-scattered electron coefficient (BEC), or the collection efficiency for secondary or back-scattered electrons emanating from storage area 108. The SEEC is defined as the number of secondary electrons generated from the medium for each electron incident onto the surface of the medium. The BEC is defined as the fraction of the incident electrons that are scattered back from the medium. The collection efficiency for secondary/back-scattered electrons is the fraction of the secondary/back-scattered electrons that is collected by an electron collector, typically registered in the form of a current.

Reading is accomplished by collecting the secondary and/or back-scattered electrons when a lower power density electron beam is applied to storage medium 106. During reading, the power density of the electron beam should be kept low enough so that no further writing occurs.

One embodiment of storage medium 106 includes a material whose structural state can be changed from crystalline to amorphous by electron beams. The amorphous state has a different SEEC and BEC than the crystalline state, which leads to a different number of secondary and back-scattered electrons being emitted when the low power density electron beam is applied to the storage area. By measuring the number of secondary and back-scattered electrons emitted, the state of the storage area can be determined. To change the material from the amorphous to crystalline state, the electron beam power density is first increased and then slowly decreased. This process heats the amorphous and then slowly cools it so that the area has time to anneal into its crystalline state. To change the material from crystalline to amorphous state, the beam power density is increased to a high level and then rapidly decreased. To read from the storage medium, a lower-energy beam is focused on a desired storage area. An example of such a type of material is germanium telluride (GeTe) and ternary alloys based on GeTe. Similar methods to modify states using laser beams as the heating source have been described in "Laser-induced Crystallization of Amorphous GeTe: A Time-Resolved Study," by Huber and Marinero, published in Physics Review B 36, page 1595, in 1987, and will not be further described here.

Other methods can also be used to induce a state change in storage medium 106. For example, a change in the topography of the medium, such as a hole or bump, will modify the SEEC and BEC of the storage medium. This modification occurs because the coefficients typically depend on the incident angle of the electron beam onto the storage area. Changes in material properties, band structure, and crystallography may also affect the coefficients. Also, the BEC depends on an atomic number, Z. Thus, one embodiment of a storage medium has a layer of low Z material on top of a layer of high Z material or vice versa, with writing accomplished through ablating some of the top layer with an electron beam.

Figure 4:
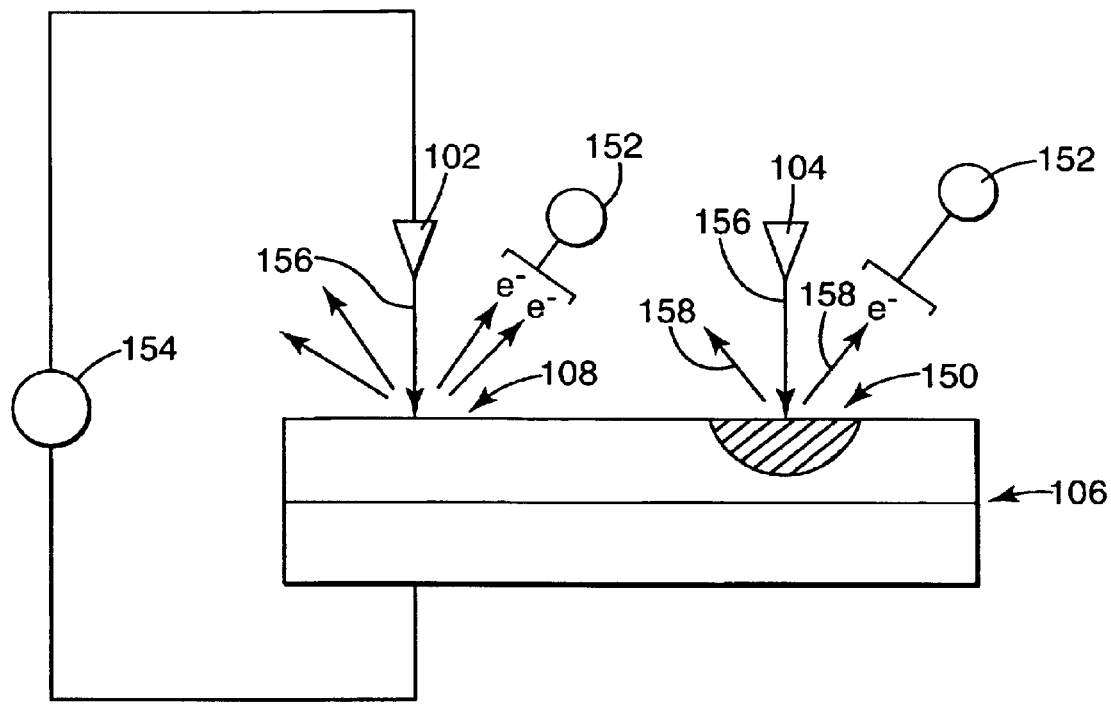
FIG. 4 is a diagram illustrating field emitters reading from storage areas in one embodiment of a storage device according to the present invention.

FIG. 4 schematically shows field emitters 102 and 104 reading from storage medium 106. The state of storage area 150 has been altered, while the state of storage area 108 has not been altered. As illustrated in FIG. 4, when a low-energy electron beam 156 strikes storage area 150, secondary and back-scattered electrons 158 are created. The secondary and back-scattered electrons 158 are then collected by electron collectors 152. An area that has been modified, such as storage area 150, will produce a different number of secondary electrons and back-scattered electrons 158, as compared to an area that has not been modified, such as storage area 108. The difference may be more or may be less depending on the type of material and the type of modification. By monitoring the magnitude of the signal current collected by electron collectors 152, the state of the storage area, and thus the bit stored, can be identified.

Field emitters may be noisy with the magnitude of the electron beam current varying with respect to time. Moreover, the gap distance between the tips of the emitters and the surface of the storage medium may vary. If the information stored were based on tunneling current, then the gap distance may be extremely crucial. However, the present invention does not depend directly on the emitted electron beam current, but rather on the effect of the beam. At least two methods may be used to alleviate the problem of the emitters being noisy. The first method is to connect a constant current source 154 to field emitter 102. Constant current source 154 controls the power density of electron beam 156. Although this method would not help storage techniques using the magnitude of the field emitted current as the signal, this method reduces the field emitter noise significantly. Another way to alleviate the field-emitter noise is to separately measure the emitted electron beam current and use it to normalize the signal current. As the electron beam current varies, the signal current varies correspondingly. On the other hand, the normalized signal current remains the same to indicate the state of the storage area.

Figure 5:
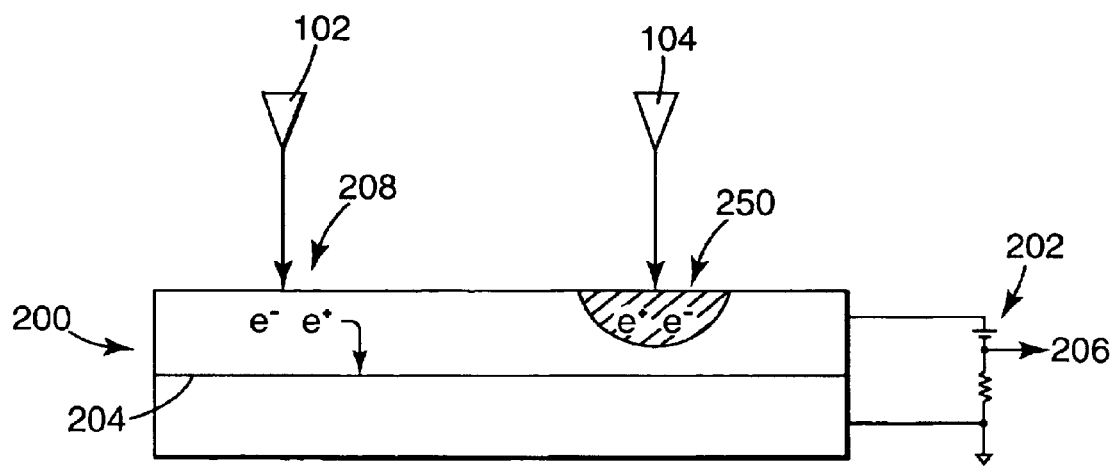
FIG. 5 is a diagram illustrating a storage medium in one embodiment based on a diode structure.

FIG. 5 shows another preferred embodiment, known in the present description as the preferred "Diode" approach. In this approach, the storage medium is based on a diode structure 200, which can be a pn junction or a Schottky barrier or any other type of "electronic valve". The basic idea is to store bits by locally altering the surface of a diode in such a way that the collection efficiency for minority carriers generated near the altered region is different from that of an unaltered region. The collection efficiency for minority carriers is defined as the fraction of minority carriers generated by the incident electrons that is swept across the diode junction 204 when it is biased by an external circuit 202, causing a signal current 206 to flow in the external circuit. The external circuit 202 shown just serves as an example of the concept. The actual external circuit may be different, but still provides a bias across the junction and measures the current across the junction.

In FIG. 5, field emitters 102 and 104 emit narrow beams of electrons onto the surface of diode 200. The incident electrons excite electron-hole pairs near the surface of the diode. The diode is reversed-biased by an external circuit 202 so that the minority carriers that are generated by the incident electrons are swept toward the diode junction 204. Electrons that reach the pn junction 204 will be swept across the junction 204. In other words, minority carriers that do not recombine with majority carriers before reaching the junction are swept across the junction, causing a current to flow in the external biasing circuit 202.

Writing onto the diode 200 is accomplished by increasing the power density of the electron beam enough to locally alter some property of the diode. The alteration will affect the number of minority carriers swept across the junction 204 when the same area is irradiated with a lower power density "read" electron beam. For example, the recombination rate in a written area 250 could be increased relative to an unwritten area 208 so that the minority carriers generated in the written area have an increased probability of recombining with majority carriers before they have a chance to reach and cross the junction 204. Hence, a smaller current flows in the external circuit 202 when the read electron beam is incident upon a written area than when it is incident upon an unwritten area. Conversely, it is also possible to start with a diode structure with a high recombination rate, and to write bits by locally reducing the recombination rate. The magnitude of the current resulting from the minority carriers depends on the state of the storage area; and the current constitutes the output signal 206 to indicate the bit stored.

Figure 6A:
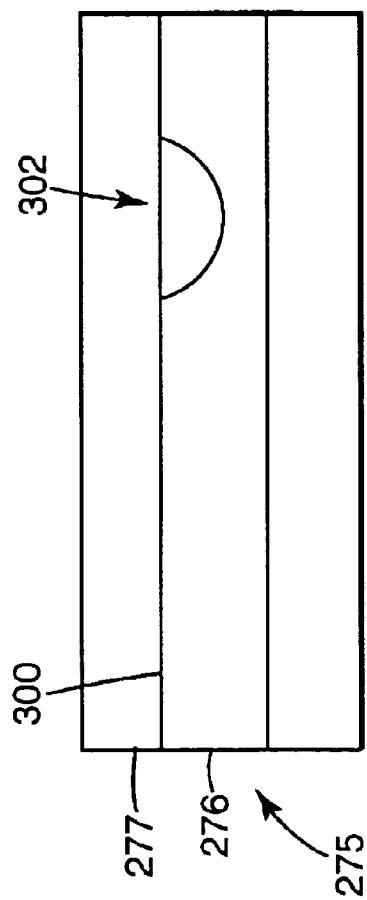
FIGS. 6A and 6B are diagrams illustrating additional embodiments of storage devices with storage mediums based on alternative diode structures.
Figure 6B:
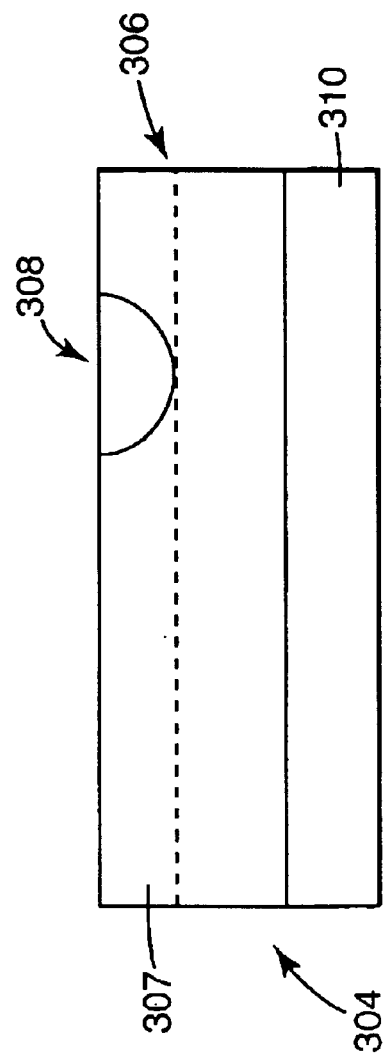

FIGS. 6A and 6B show different preferred diode structures as storage media in the present invention. FIG. 6A shows a diode structure 275 with a gain layer 276, and a "poor" oxide layer 277 on top of gain layer 276. "Poor" here means the interface or boundary 300 between the oxide 277 and the diode 275 has a high surface recombination rate. One example of such a diode is a silicon pn junction with a poor thermal oxide on its top surface. The interface 300 can be passivated with hydrogen to reduce its surface recombination rate. Electron beams may be used to heat up an area 302 of the hydrogenated interface to increase the recombination rate by either driving away the hydrogen or introducing defects. Methods to passivate recombination sites at a silicon/thermal oxide interface by hydrogenation are known in the art and will not be further described here.

FIG. 6B shows a pn junction diode structure 304 with either the p or the n layer as the top layer 306. Either all, or just the top surface 307, of the top layer 306 consists of hydrogenated amorphous silicon that is doped to be consistent with the doping of the rest of the top layer 306, which consists of crystalline silicon. The surface of the hydrogenated amorphous silicon layer 306 can be easily damaged by bombarding it with an electron beam. Such damage in a storage area 308 can introduce defects in the hydrogenated amorphous silicon layer that act as recombination sites increasing the recombination rate. The damage can be reversible by heating. Thus, one can have a bulk erase by resistively heating the entire storage medium. The building of such a diode can be found in "Electron-Beam-Induced Information Storage in Hydrogenated Amorphous Silicon Devices," by Yacobi, published in J. of Appl. Phys. Lett. 44, page 695, in 1984, and will not be further described here.

FIG. 6B can also be used to show another preferred diode structure, with the layer 306 being a phase-change material, such as a layer of germanium telluride, GeTe, which can be reversibly changed from a semiconducting (amorphous) to a metallic (crystalline) state by heating and cooling it at the proper rate. Thus, for example, if the GeTe is doped so that it is p-type when in its semiconducting state and is deposited on top of an n-type semiconductor layer 310, then a large contrast will be seen in the number of carriers swept across the junction if the GeTe is changed to its metallic state at the storage area 308.

FIG. 7 shows another preferred embodiment 350 with a florescent layer 352 on a photodiode structure 354. Information is stored by using the field emitters to locally alter the light emitting properties of the florescent layer. The alteration changes the number of photons emitted by the florescent layer 352 and received by the photodiode 354 for each incident electron. Such changes can be carried out by striking a storage area 356 with an electron beam current with high enough power density to heat the storage area 356 to a high temperature. Most florescent materials are easily damaged by such heating. This damage increases the relative number of non-radiative recombination centers to radiative recombination centers so that the number of photons emitted by the florescent material for each incident electron is reduced. Alternatively, high energy electrons can be used to similarly alter the florescent material. In the read mode, an electron beam current with a lower power density is used to ensure that no further writing occurs. A meter 358 measures the current across the photodiode, which depends on the number of photons received by the photodiode and provides indication as to whether the storage area is altered or not. One possible example for the florescent layer is zinc oxide. The methods to build a florescent layer onto a photodiode should be known in the art and will not be further described here.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A storage device comprising:
   a field emitter for generating an electron beam current;
   a storage medium in close proximity to the field emitter, the storage medium having a plurality of storage areas for storage of information, each of the plurality of storage areas being in one of a plurality of states to represent the information stored in that storage area;
   such that:
   an effect is generated when the electron beam current bombards one of the storage areas;
   the magnitude of the effect depends on the state of the bombarded storage area; and
   the information stored in the bombarded storage area is read by measuring the magnitude of the effect; and
   an electron beam steering mechanism for deflecting the electron beam current in two substantially perpendicular directions to different ones of the storage areas.

2. The storage device of claim 1, wherein the electron beam steering mechanism comprises:
   a first set of electrodes for deflecting the electron beam current in a first direction; and
   a second set of electrodes for deflecting the electron beam current in a second direction substantially perpendicular to the first direction.

3. The storage device of claim 1, and further comprising:
   a micromover for causing a change in the relative positions between the field emitter and the storage medium.

4. The storage device of claim 3, wherein the micromover is configured to cause movement of the field emitter.

5. The storage device of claim 3, wherein the micromover is configured to cause movement of the storage medium.

6. The storage device of either claim 1 or 3, wherein the electron beam current traces out a periodic trajectory on the storage medium.

7. The storage device of claim 6, wherein the shape of the periodic trajectory is one of a circle, ellipse, spiral, square, rectangle and figure 8.

8. The storage device of claim 6, wherein the shape of the periodic trajectory is one of a triangle wave shape, a sawtooth wave shape, a Lissajous wave shape, a rectangle wave shape, and a sinusoidal wave shape.

9. The storage device of claim 1, wherein at least a portion of the information stored in the storage areas is stored and read based on pulse width modulation (PWM).

10. The storage device of claim 1, and further comprising:

a plurality of field emitters, each being similar to the field emitter recited in claim 1, such that the plurality of field emitters work in parallel to read information from the device; and a plurality of electron beam steering mechanisms for deflecting the electron beam currents from the plurality of field emitters to different ones of the storage areas.

11. A method of accessing information from a storage medium, the storage medium including a plurality of storage areas for storing information, each storage area being in one of a plurality of states to represent the information stored in that storage area, the method comprising:

generating an electron beam current with a field emitter, the electron beam current directed toward a first one of the storage areas on the storage medium;

detecting an effect in the first one of the storage areas caused by the electron beam current, the effect based on the state of the storage area; and steering the electron beam current in two dimensions to multiple ones of the storage areas.

12. The method of claim 11, wherein steering the electron beam current comprises:

deflecting the electron beam current in a first direction with a first deflection mechanism; and deflecting the electron beam current in a second direction substantially perpendicular to the first direction with a second deflection mechanism.

13. The method of claim 11, and further comprising:

generating a change in the relative positions between the field emitter and the storage medium.

14. The method of claim 13, wherein the generating a change step includes moving the field emitter.

15. The method of claim 13, wherein the generating a change step includes moving the storage medium.

16. The method of either claim 11 or 13, wherein the electron beam current traces out a periodic trajectory on the storage medium.

17. The method of claim 11, wherein at least a portion of the information stored in the storage areas is stored using pulse width modulation (PWM).

18. The method of claim 11, and further comprising:

generating a plurality of electron beam currents with a plurality of field emitters;

steering each electron beam current toward one of the plurality of storage areas on the storage medium; and detecting an effect in each of the storage areas caused by the electron beam current directed at that storage area, the effects based on the state of the storage areas.

19. A storage device comprising:

a field emitter for generating an electron beam current;

a storage medium in close proximity to the field emitter, the storage medium having a plurality of storage areas for storage of information, each of the plurality of storage areas being in one of a plurality of states to represent the information stored in that storage area, the information stored in a storage area being read by bombarding the storage area with the electron beam current and measuring an effect generated by the bombardment; and a beam deflector for deflecting the electron beam current in two substantially orthogonal directions.

20. The storage device of claim 19, and further comprising:

a plurality of field emitters, each being similar to the field emitter recited in claim 19, such that the plurality of field emitters work in parallel to read information from the device; and a plurality of beam deflectors for deflecting the electron beam currents from the plurality of field emitters in two substantially orthogonal directions.

* * * * *